United States Patent [19]

Cyr

[11] 4,097,837

[45] Jun. 27, 1978

[54] UNDERWATER TRANSPONDER CALIBRATION ARRANGEMENT

[76] Inventor: Reginald J. Cyr, 700 Francis Botello Rd., Goleta, Calif. 93017

[21] Appl. No.: 671,675

[22] Filed: Mar. 29, 1976

[51] Int. Cl.² .............................................. G01S 9/66
[52] U.S. Cl. .................................... 340/5 C; 340/3 E
[58] Field of Search ........... 340/3 E, 6 R (U.S. only), 340/5 C; 343/6.5 R (U.S. only)

[56] References Cited

U.S. PATENT DOCUMENTS

| 3,860,900 | 1/1975 | Scudder | 340/3 E |
| 3,864,662 | 2/1975 | David et al. | 340/3 E |

Primary Examiner—Richard A. Farley
Attorney, Agent, or Firm—Don B. Finkelstein

[57] ABSTRACT

An arrangement for determining the relative three dimensional positional relationship, including the horizontal separation, location, and orientation between a plurality of underwater transponders. A plurality of underwater transponders are positioned adjacent the bottom of the body of water and the number of the plurality of transponders for an unambiguous determination comprises at least three. In one embodiment, each of the transponders is provided with structure to receive a first interrogation frequency signal and generate a unique output signal in response thereto. Additionally, a first of the transponders also is provided with structure to generate the first interrogation frequency signal in response to a second interrogation frequency signal. A second of the plurality of transponders is provided with structure to generate the first interrogation frequency signal in response to a third interrogation frequency signal. A base station which, for example, may be a ship located at first location on the surface of the water within signal range of each of the transponders has structure for generating each of the first, second and third interrogation frequency signals in a predetermined sequence. The time period from transmission of each interrogation signal to receipt of the unique output signals from each of the plurality of transponders is measured. The depth below the surface of the water of at least two of the plurality of transponders is measured and from the measured values, the true three dimensional positional relationship between the transponders is uniquely determined. By moving the ship to a second location and repeating the signal transmissions and time measurements, the orientation of the array with respect, for example, to the earth's magnetic field may be determined. The time period for the measurements is comparatively short - on the order of one minute or so. If desired, the first and second transponders which may be termed calibration transponders, may be removed from the array after the absolute value of the three dimensional positional relationship between the transponders and/or the orientation has been determined. The absolute geodetic position may be determined by utilization of an external reference system.

42 Claims, 12 Drawing Figures

UNDERWATER TRANSPONDER CALIBRATION ARRANGEMENT

BACKGROUND OF THE INVENTION

1. Field of the Invention

This invention relates to the transponder calibration art and more particularly an improved arrangement for determining three dimensional positional relationahip between a plurality of underwater transponders.

2. Description of the Prior Art

Underwater transponders positioned adjacent the bottom of a body of water are extensively used, for example, in providing a highly accurate navigation or position system. For example, a ship upon the surface of the water (or, alternatively, a submarine at a depth below the surface of the water) utilizes the output signals from such underwater transponders to determine its position. In one common application, each underwater transponder may generate a unique output frequency signal in response to interrogation by the ship at a common interrogation frequency signal. For the most accurate unambiguous positioning of a ship it is generally preferred to utilize at least three transponders. The ship transmits the interrogation frequency to the transponders and measures the transit time from the generation of the common interrogation signal to the receipt of the output signals sent from the transponders. As noted above, in many applications it is preferred that each of the transponders utilized for a single position determination by the ship generate different output signals in response to the common interrogation frequency signal. Alternatively, of course, each of the transponders in the localized array may generate a common output signal in response to different interrogation frequency signals.

One type of surface or underwater vessel positional determination utilizing a calibrated and orientation determined array heretofore proposed is described in the publication, "Precise Position Fixing By Acoustic Means", published by the Bendix Corporation, Electro Dynamics Division, 15825 Roxford Street, Sylmar, California, 91342, Published November, 1971. The technique described therein utilizes, in part, a conventionally calibrated array of bottom located transponders.

In order for such an arrangement of transponders to provide the necessary positional information for a ship, the position of each of the transponders in relation to each of the other transponders must be known in order that the slant range from the ship to each transponder may be accurately determined to provide the position information. Thus, it is necessary to determine the three dimensional positional relationship between the transponders in the array. Such determination is generally termed calibration of the transponder array. Additionally, in many applications, it is also preferred to establish the orientation of the entire array, that is, its orientation with respect to, for example, the earth's magnetic field. Finally, in some applications, it is also preferred to establish the geodetic position of the array. Thus there are generally the three steps: calibration, orientation determination and geodetic determination that may be accomplished.

In establishing such a transponder array, in general, a plurality of transponders are dropped by free fall, for example, to the bottom of the body of water. A calibration procedure is then followed in order to determine the relative three dimensional geometry of the array of transponders.

The procedure for calibrating the transponder array to determine the three dimensional positional relationship between each of the transponders in the array, and/or the orientation determination, as presently practiced, generally comprises one of two methods. The first method generally comprises a leg bisection noted at the surface of the body of water as a minimum in the sum of the ranges of any two of the transponders followed by depth determination by overhead interrogation, and iteratively looking for the closest point of approach. A second method generally practiced today generally comprises accumulating signal transit time information from a plurality of points on the surface of the water and correlating the results to determine the array geometry. Both these methods, as heretofore utilized, require substantial maneuvering and time on the part of the surface craft performing the calibration and/or accurate positional determinations of the ship's location the various points of measurement. Therefore, it is very time consuming and extremely costly. Additionally, since the signals transmitted by the transponders as well as by the ship are generally acoustic signals, the velocity of sound in the water due to, for example, temperature variations or the like over the various paths and additionally, refraction errors, result in less precision in determining the geometry of the transponders in the array and/or orientation determination, than is desired. Additionally, correlation of the relative position of the ship on the surface requires precise determination of the ship's location at each measuring location.

Geodetic determination of the array is generally accomplished by utilization of an external reference system such as visual sightings, satellite, or the like.

The following United States patents show other systems that have heretofore been proposed for utilization in ship positional determinations, underwater transponder arrangements, and/or other types of ancillary equipment useful in determining the position of one or more objects either on the surface of the water or under the water in relationship to each other.

| 3,559,161 | 3,160,846 | 3,848,225 |
| 3,792,424 | 3,383,651 | 3,222,634 |
| 3,731,264 | 3,800,272 | 3,496,524 |
| 3,745,518 | 3,441,901 | 3,781,775 |
| 3,292,139 | 3,421,138 | 3,805,227 |
| 3,283,292 | 3,299,398 | 3,189,870 |
| 3,432,851 | 3,803,541 | 3,713,082 |

SUMMARY OF THE INVENTION

Accordingly, it is an object of the present invention to provide an improved underwater transponder calibration arrangement.

It is another object of the present invention to provide an underwater transponder calibration arrangement in which the three dimensional positional relationship between an array of transponders and/or the orientation may be more rapidly and more accurately determined.

It is yet another object of the present invention to provide an underwater transponder calibration arrangement in which calibration of an array of underwater transponders may be more economically accomplished.

It is yet another object of the present invention to establish a technique for calibration of an underwater transponder array utilizing a single surface or under surface measuring point.

It will be appreciated that, because of the costs associated with the calibration techniques heretofore utilized in the prior art, as described above, underwater transponders have generally not been economically feasible for utilization in comparatively short term sea operations, such as underwater exploration, exploitation and the like.

In one embodiment of the present invention there is provided a plurality of at least three underwater transponders. The transponders are deployed in a spaced array in regions adjacent the bottom of a body of water such as, for example, the ocean. Each of the transponders is within signal transmission and receiving range of each other, and each are adapted to generate a different output signal in response to receiving a first interrogation signal.

A first of the pluarlity of transponders is also provided with structure for generating the first interrogation signal in response to receiving a second interrogation signal. A second of the plurality of transponders is provided with structure for generating the first interrogation signal in response to receiving a third interrogation signal. The first and second transponders may be termed the calibration transponders.

A base station which, for example, may be a ship located at a single point or location on the surface of the water, a buoy floating on the surface of the water, an underwater vessel, or the like, is provided with signal generating and receiving means.

The calibration technique described herein only requires a single point or location for measurement by the base station. However, there is no loss of accuracy if the point of measurement does in fact move. No correlation of the relative positions or movements of the base station is required in the practice of the present invention for calibrating the array. The base station generates each of the first, second, and third interrogation signals sequentially and measures the time period from signal transmission to receiving the plurality of different output signals from the transponders.

Since each transponder responds at its unique output after it has received the first interrogation signal, each transponder generates and transmits its unique output signal whether the first interrogation signal has been transmitted from the base station or from one of the other transponders.

The depth of at least the first and second transponders is also measured. Measurement of the depth of each of the transponders does not, per se, form the present invention. That is, any heretofore utilized technique for determining the individual depth of the transponders may be utilized. Such techniques may, of course, include overhead interrogation, depth and/or altitude sounding by conventional sonar techniques, or by having the transponders themselves provided with depth sensing structure such as hydrostatic pressure detector with associated acoustic telemetry to transmit depth information signals to the base station.

Array orientation with respect, for example, to the earth's magnetic field and geodetic positioning may be accomplished, if desired, by conventional techniques and such measurement techniques do not in and of themselves form the present invention.

Alternatively, by moving the base station to a second location on a known heading from the first location and repeating the measurements described above, information is obtained from which the orientation of the array may be determined. Thus, utilizing the principles of the present invention, both the array geometry and orientation may be rapidly and accurately determined.

From the measured time responses and the known depth of the transponders the three dimensional positional relationship between each of the transponders in the array may be calculated. The calculations involve elimination of the comparatively long slant range height from the base station to each transponder and thus errors inherent in such slant range are eliminated. Such errors, of course, as noted above, occur becuase of variations in temperature of the water, particularly near the surface, which varies the velocity of sound in the water, or the like.

Thus, the true geometry of the array can be rapidly determined from a single base station at a single point or at a series of points requiring no relative positional determination therebetween in a comparatively short time.

Each set of calibration signal generating and receiving sequency of operations by the base station is complete and is rapidly accomplished, for example on the order of one to two minutes. During this time period the complete set of data required for calibration of the array of transponders is obtained. This compares with the present techniques requiring up to hours or even days for such calibration.

The first and second transponders described above, in this embodiment, form part of the three transponder array, for example, and may be maintained as part of the array if desired.

In other embodiments of the present invention, the first and second transponders are recoverable and a plurality of other transponders which do not have the capability of transmitting the common or first interrogation signal in response to a second interrogation signal are left in the array for navigational aids as long as required. At the end of the requirement, those transponders may also be recovered.

Thus, two of the transponders termed the calibration transponders, having the capability of generating the common interrogation signal in response to separate unique interrogation signals may be utilized to calibrate the position of any number of transponders within signal exchange range thereof.

In general, as heretofore utilized, the interrogation signals and response frequency signals of the transponders are acoustic signals.

In another embodiment of the present invention, the array may be calibrated by utilization of a buoy and an airplane. That is, not only may the transponders be air dropped by an airplane but also a buoy is dropped to serve as part of the base station. The buoy has the capability of receiving the acoustic signals from each of the transponders as well as generating the desired acoustic signals for interrogating each of the transponders. The airplane receives the signals generated by the buoy which, for example, may comprise RF carrier signals modulated by the acoustic signals. This embodiment of the present invention provides an extremely low cost and very rapid calibration of a transponder array.

In those embodiments of the present invention wherein the special calibration transponders with the additional capability described above are utilized in conjunction with a plurality of other transponders, the special transponders may be recoverable after calibration for subsequent utilization in calibrating other transponder arrays. Alternatively, they may be short or long term expendable.

In yet other embodiments of the present invention, the calibration is carried out with transponders provided with structure for generating a common, or the same, output signal in response to different interrogation frequency signals. In such an embodiment, the two special or calibration transponders have the additional capability of sequentially generating the interrogation signal of each of the other transponders in the array in a predetermined timed sequence in response to a special interrogation signal.

BRIEF DESCRIPTION OF THE DRAWINGS

The above and other embodiments of the present invention may be more fully understood from the following detailed description taken together with the accompanying drawings wherein similar reference characters refer to similar elements throughout and in which.

DESCRIPTION OF THE PREFERRED EMBODIMENTS

Figure 1:
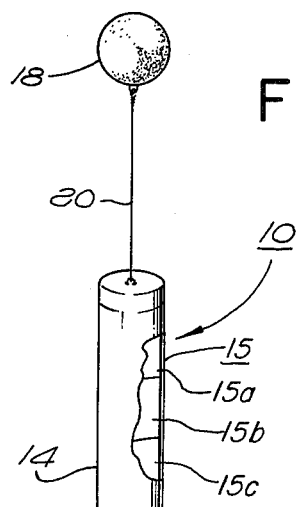
FIG. 1 is a diagramatic representation of a underwater transponder useful in the practice of the present invention.

Referring now to FIG. 1 there is illustrated, in diagramatic form, an underwater transponder useful in the practice of the present invention. The underwater transponder generally designated 10 may be of the type manufactured by Sonatech, Inc., 700 Francis Botello Road, Goleta, California, 93017 such as the model STI-100 1AR Recoverable Transponder. As such, the transponder 10 is generally provided with a base plate 12 connected to a transponder body 14 by a cable means 16. The length of the cable 16 selected is a compromise between signal range, at the bottom or to the surface, and accuracy of transponder 14 location relative to the base plate 12. The shorter the cable 16, the shorter the limiting ray path for signals transmitted from the transponder 14 but the smaller the "scope" error, i.e., variable vertical deviations of the transponder 14 from the base plate 12. For longer cable 16 lengths, the limiting ray path, and hence the range is increased but scope errors also increase. It will be appreciated that, in general, the scope errors are comparatively long term variations. That is, ocean currents at the bottom are relatively stable and vary only over comparatively long time periods. The short calibration time, according to the principles of the present invention, virtually eliminates scope errors in the calibration of the array. The base plate 12 is adapted to rest on the bottom of a body of water such as the ocean bottom.

If desired, a float means 18 may be connected by a cable 20 to the transponder body 14 for orientation of the transponder body 14 at the distance determined by the length of the cable 16 above the ocean floor. Additionally, the float 18 may have sufficient buoyancy so that the transponder body 14 and float 18 may be recovered at a predetermined time by severing the cable 16. Such severing of the cable 16 may, if desired, be provided by actuation of an explosive bolt or comparable release mechanism upon receipt of an appropriate signal by the transponder body 14.

Figure 2:
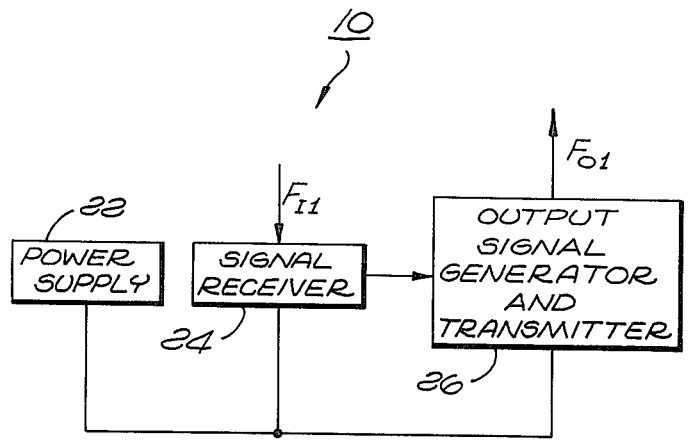
FIG. 2 is a functional block diagram of an underwater transponder useful in the practice of the present invention.

FIG. 2 is a block diagram of the transponder 10 shown in FIG. 1. As shown in FIG. 2 the transponder body 14 houses a power supply 22 powering a signal receiver means 24 and an output signal generator and transmitter means 26. The signal receiver means 24 is adapted to receive a first interrogation signal, designated $F_{I1}$ and generate a unique output signal, designated $F_{O1}$, in response thereto. The first interrogation signal $F_{I1}$, first output signal $F_{O1}$ as well as the other signals generated by and transmitted by the transponders according to the principles of the present invention, are acoustic signals in the range, for example, 1 to 400 kHz. The block diagram of FIG. 2 illustrates the basic components of the transponder 10 primarily utilized in the practice of the present invention.

Figure 3A:
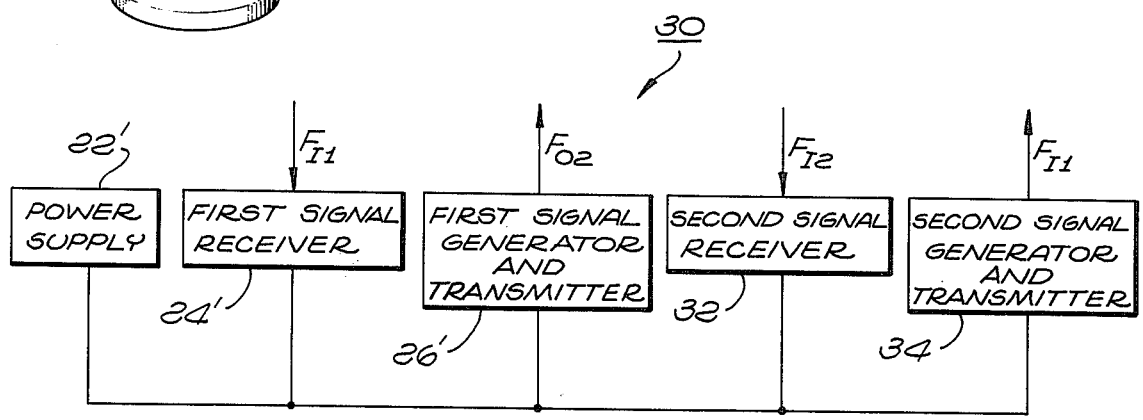
FIGS. 3A and 3B are block diagrams of underwater calibration transponders useful in the practice of the present invention.

FIG. 3A is the block diagram of another transponder, generally designated 30, which may be termed a calibration transponder, useful in the practice of the present invention. The transponder 30 may be of a similar form to the structure illustrated in FIG. 1 and be provided with a power supply 22' similar to the power supply 22 described above, powering a first signal receiver means 24' which may be similar to the signal receiver 24 described above and a first signal generator and transmitter means 26' which may be similar to the output signal generator transmitter means 26 described above except that the first signal generator and transmitter means 26' generates an output signal $F_{O2}$ having a characteristic, such as frequency different from the output signal generated by the signal generator and transmitter means 26. The transponder 30, which may be described as a calibration transponder, is also provided with a second signal receiving means 32 for receiving a second interrogation signal $F_{I2}$, having a characteristic, such as frequency, different from the first interrogation signal $F_{I1}$, and generating the first interrogation signal $F_{I1}$ by second signal generator and transmitter 34 in response thereto.

Figure 3B:
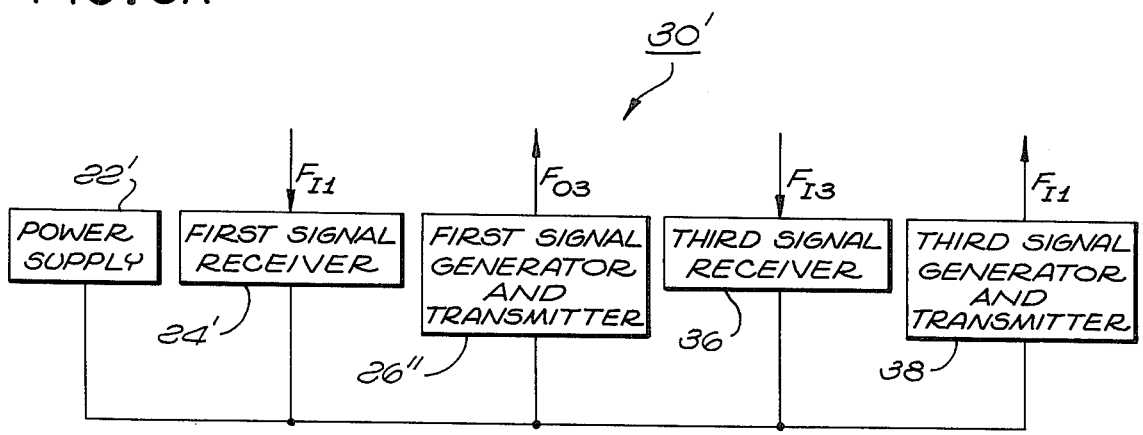

In this embodiment of the present invention, two calibration transponders, 30 and 30' are utilized in conjunction with one other transponder 10. The difference between the calibration transponder 30 and 30', as shown in FIG. 3B is that the calibration transponder 30' in addition to being provided with the power supply 22' and first signal receiver means 24' is provided with a first signal generator and transmitter means 26" for generating a unique output signal $F_{O3}$ having a characteristic, such as frequency, different from $F_{O1}$ and $F_{O2}$, in response to receipt of the first interrogation signal $F_{O1}$. Additionally, the calibration transponder 30' is provided with a third signal receiver means 36 for receiving a third interrogation signal $F_{I3}$ having a characteristic, such as frequency, different from $F_{I1}$ and $F_{I2}$, and with a third signal generator and transmitter means 38 for transmitting the first interrogation signal $F_{I1}$ in response thereto.

Figure 4:
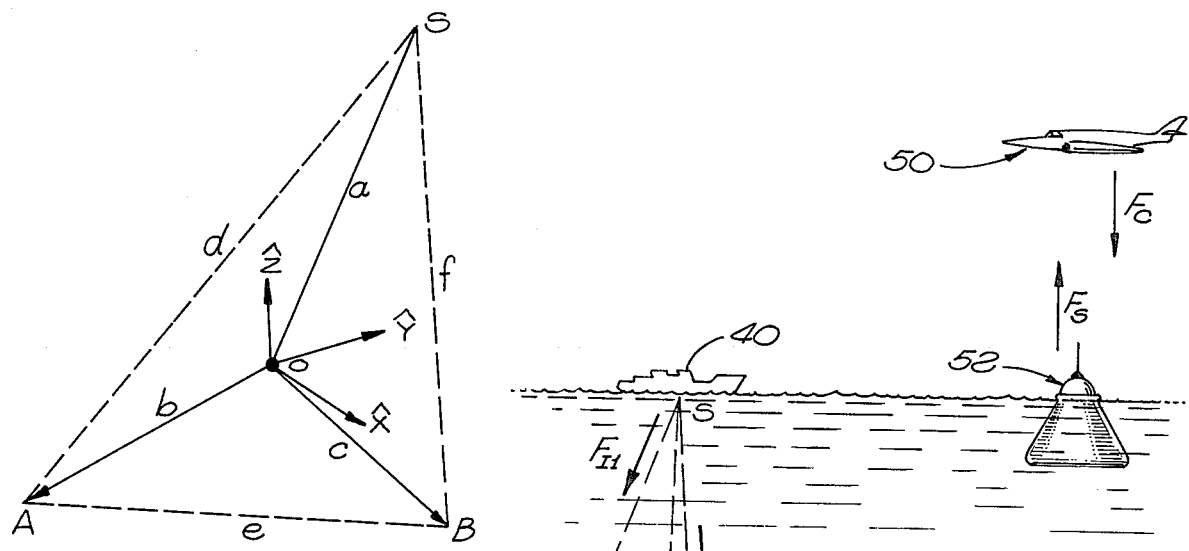
FIG. 4 is a diagramatic representation of a step in the calibration technique according to the principles of the present invention.

Referring now to FIG. 4 there is illustrated one embodiment of the present invention for calibrating an array of spaced apart transponders 10, 30, and 30′ which have been deployed in a spaced apart relationship in regions adajacent the ocean floor. As can be seen from FIG. 4, the transponders 10, 30 and 30′ are not vertically aligned with the base plates 12, 112′ and 12″, respectively. This indicates the above described "scope" error, since they may be displaced from the vertical due to bottom currents, or the like, as they swing on the cables 16, 16′ and 16″, respectively.

A base station 40 which, in the embodiment shown in FIG. 4 may comprise a ship, is located at point 5, and is utilized to transmit the necessary signals and receive the necessary signals from the transponders 10, 30, and 30′ in order to collect sufficient data to allow calibration of the transponder array 10, 30, and 30′ and determination of the relative geometry therebetween consisting of the dotted lines $b$, $c$, and $e$.

In the embodiment shown in FIG. 4, the point S, is within signal transmission range of each transponder 10, 30, and 30′. Each transponder 10, 30 and 30′ is within signal transmission range of each other. In other embodiments of the present invention, as described below, only the two calibration transponders 30 and 30′ need be in signal transmission range of each other and of each other transponder in the array.

After deployment of the transponders, the base station 40 transmits the signal $F_{I1}$ to regions containing the three transponders 10, 30, and 30′. Upon receipt of the first interrogation signal $F_{I1}$ each of the transponders generates the output signal appropriate thereto comprising the output signal $F_{O1}$ for transponder 10, $F_{O2}$ for transponder 30, and $F_{O3}$ for transponder 30′. The time period from the transmission of the first interrogation signal $F_{I1}$ by the base station 40 to the receipt of the output signals $F_{O1}$, $F_{O2}$, and $F_{O3}$ thereby is measured.

The next step in the calibration is for the base station 40 to generate the second interrogation signal $F_{I2}$. Upon receipt of the second interrogation signal $F_{I2}$ transponder 30 generates the first interrogation signal $F_{I1}$ to regions adjacent transponders 10 and 30′. Transponder 10 upon receipt of the first interrogation signal $F_{I1}$ generates the output signal $F_{O1}$ for transmission to the base station 40. Upon receipt of the first interrogation $F_{I1}$ the transponder 30′ generates the output signal $F_{O3}$ and transmits it to the base station 40. The time period between the transmission of the second interrogation signal $F_{I2}$ and receipt of the signal $F_{O1}$ and $F_{O3}$ are measured. By subtracting the time periods associated with the first step from the appropriate time periods associated with the second step the length of the legs $b$ and $c$ may be calculated. That is, the transmission time along the paths $a$, $d$, and $f$, are the same in both the first and second steps and therefore the long slant lengths represented by these paths, and errors associated therewith, are automatically cancelled out of the calculation to provide an accurate evaluation of the base legs $b$ and $c$.

The next step is to have the base station 40 transmit the third interrogation frequency signal $F_{I3}$ to the transponder 30′. Upon receipt of the third interrogation signal $F_{I3}$ transponder 30′ generates the first interrogation signal $F_{I1}$ and transmits it to regions adjacent transponders 10 and 30. Upon receipt of this first interrogation signal $F_{I1}$ transponder 10 transmits its output signal $F_{O1}$ and transponder 30 transmits its output signal $F_{O2}$. The time period between the transmission of the third interrogation signal $F_{I3}$ from the base station to receipt of the output signals $F_{O1}$ and $F_{O2}$ from transponders 10 and 30 respectively, is measured. By subtracting the time periods associated with slant lengths $d$ and $f$, the length of the base leg $e$ is determined.

If the three transponders 10, 30, and 30′ are all at the same depth then the true horizontal separation between the three transponders has been determined. However, as noted above, in many situations, the transponders will not be at the same depth and consequently, the depth of at least two of the transponders, 10, 30 and 30′ preferably 30 and 30′, must be individually determined. The well-known techniques described above may be utilized to determine the individual depths of the transponders 10, 30, and 30′. As shown on FIG. 1, the transponder 10 may incorporate the means for determining the depth thereof below the surface and generally designated 15. As such, means 15 may comprise depth sensing means 15a for sensing the depth, depth signal generating means 15b for generating a depth signal proportional to the measured depth, and depth signal transmission means 15c for transmitting the depth signal to remote regions such as those regions containing the base station 40. Similar structure may also be incorporated, if desired or required for particular applications, in all transponders such as transponders 30 and 30″. As noted above, the depth sensing means does not, per se form the present invention.

From the example shown above, it is apparent that with two calibration transponders, 30 and 30′, the geometry of any number of other transponders may be determined as long as the other transponders are within signal transmission range of the calibration transponders. For the example shown in FIG. 4 and wherein it is desired to have three transponders in the array to provide accurate positioning of a subsequent vessel on the surface of the water, the calibration transponders 30 and 30′ remain as part of the array.

While in some applications just a determination of the three dimensional geometry between the transponders in an array may be all that is required, in many other applications, it is also necessary to determine the relative orientation of the transponder array with respect to a known reference, such as the earth's magnetic field. If the base station 40, is moved along a known heading to a second location $S_2$ and the above described steps are repeated at locations $S_2$, the orientation of the array of transponders 10, 30 and 30′ with respect to the earth's magnetic field is determined.

It is not necessary, according to the principles of the present invention to know the actual separation distance between points S, and $S_2$. It is only required that the heading of $S_2$ with respect to S, be known.

As noted above, in many applications it is also desireable to obtain a geodetic determination of the transponder array, i.e., it's absolute position on the earth. Such determination may be made, of course, by knowledge of the geodetic position, from satellites of the like, of either position S, or $S_2$.

Figure 5:
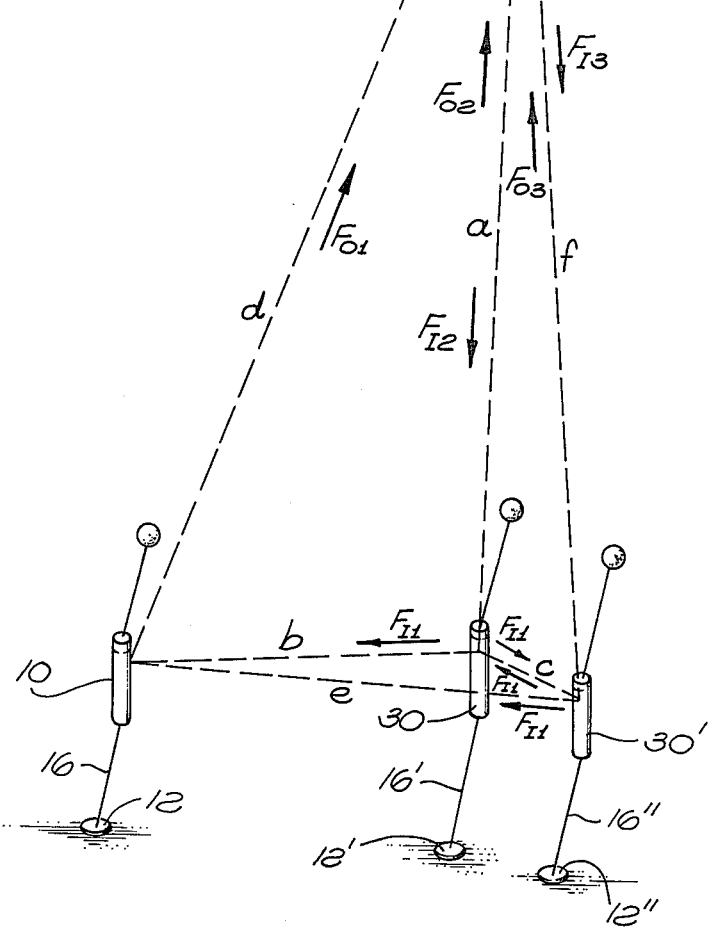
FIG. 5 is a diagramatic representation of another step in the calibration technique useful in the practice of the present invention.

FIG. 5 illustrates the geometry for obtaining the length of the legs $b$, $c$, and $e$ as well as the coordinate points with reference to the position of the base station for an array of two calibration transponders and any one other transponder. In FIG. 5, the base station is indicated by the letter S. Transponder 10 is represented by the letter A, transponder 30 is represented by the letter O and transponder 30' is represented by the letter B. The coordinate system is selected so that the origin thereof is at the point O and, additionally, point B is selected so that it lies on the X, Z plane. Since the origin of the coordinate system cooresponds with the position of the calibration transponder 30, it is necessary to determine the coordinates of the base station located at S, transponder 10, located at A, and transponder 30' located at B. These coordinates may be expresses in terms of the coordinate system shown in FIG. 5 by the following three equations:

$$S = S_x X + S_y Y + S_z Z \quad (1)$$

$$A = A_x X + A_y Y + A_x Z \quad (2)$$

$$B = B_x X + B_y Y + B_z Z \quad (3)$$

Since the known variables are $a$, $b$, $c$, $d$, $e$, and $f$, the unknown variables are $B_x$, $S_x$, $S_y$, $A_x$, $A_y$ and $A_z$. Thus, there are six unknown variables. In order to obtain an unambiguous solution to six unknown variables, there must be set up six simultaneous equations. These equations are as follows:

$$c^2 = B x^2 + B z^2 \quad (1)$$

$$a^2 = S x^2 + S y^2 + S z^2 \quad (2)$$

$$f^2 = (S x - B x)^2 + S y^2 + (S z - B z)^2 \quad (3)$$

$$b^2 = A x^2 + A y^2 + A z^2 \quad (4)$$

$$d^2 = (S x - A x)^2 + (S y - A y)^2 + (S z - A z)^2 \quad (5)$$

$$e^2 = (B x - A x)^2 + A y^2 + (B z - A z)^2 \quad (6)$$

Solving the simultaneous equations with the known variables $a$, $b$, $c$, $d$ and $f$, the coordinate points for each of the base station 40, transponder 10 and transponder 30' is determined for the coordinate system selected. It will be appreciated that the origin of the coordinate system may be selected as desired, for example, the surface point S.

The above calculations may be repeated for the condition of the base station 40 moved to a second location spaced from and on a known heading from points. In addition to providing additional accuracy in calculations of the three dimensional relative position of the transponders, the orientation of the array may be determined from the second set of measurements.

Where accurate geodetic positioning is required, the base station 40 may obtain satisfactory geodetic positioning from satellites or other well-known techniques. Thus, the coordinate system, the relative three dimensional geometry and the orientation of the array of transponders may be uniquely determined according to the principles of the present invention.

Figure 6:
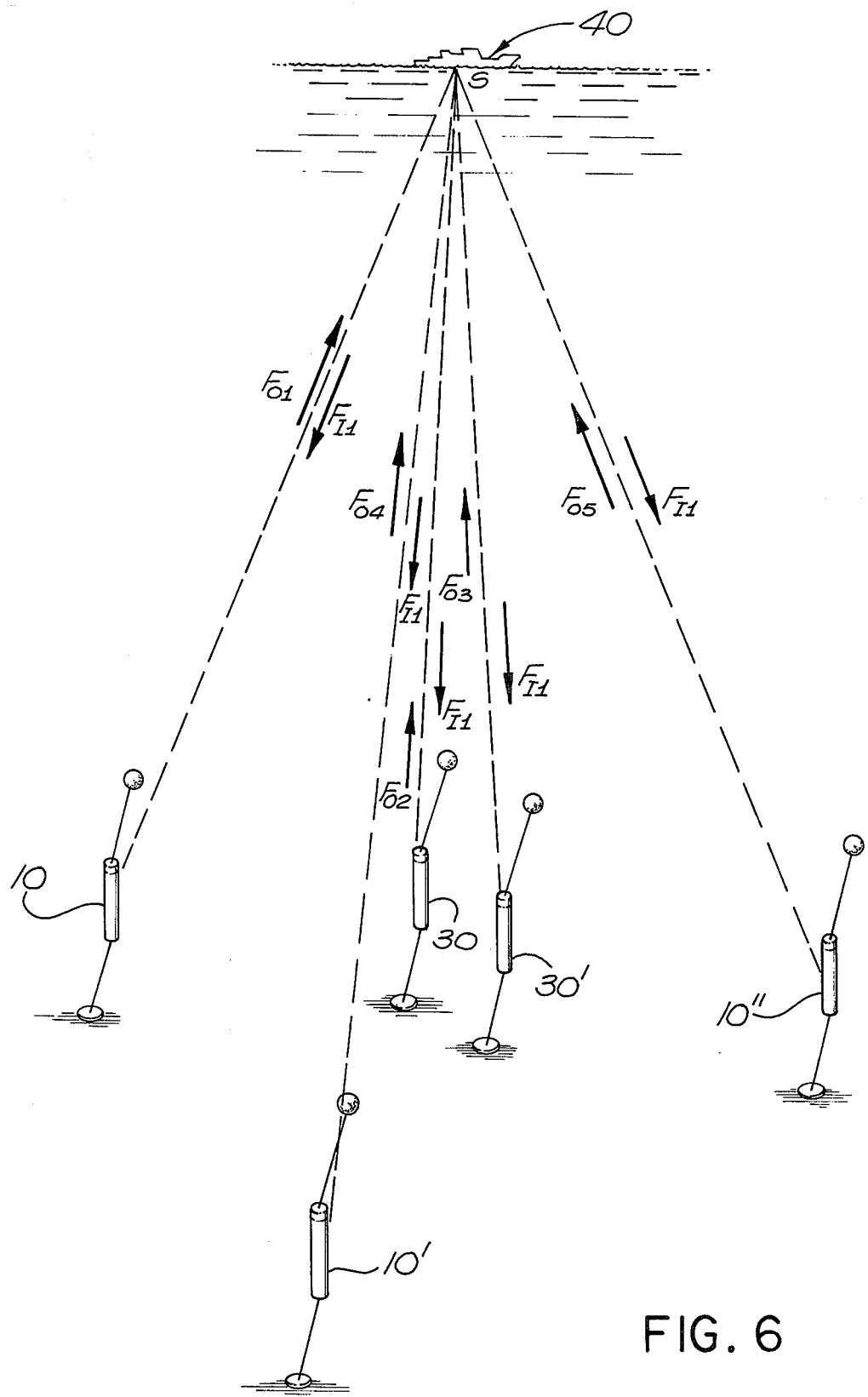
FIG. 6 is a diagramatic representation of another step in the calibration technique useful in the practice of the present invention.
Figure 7:
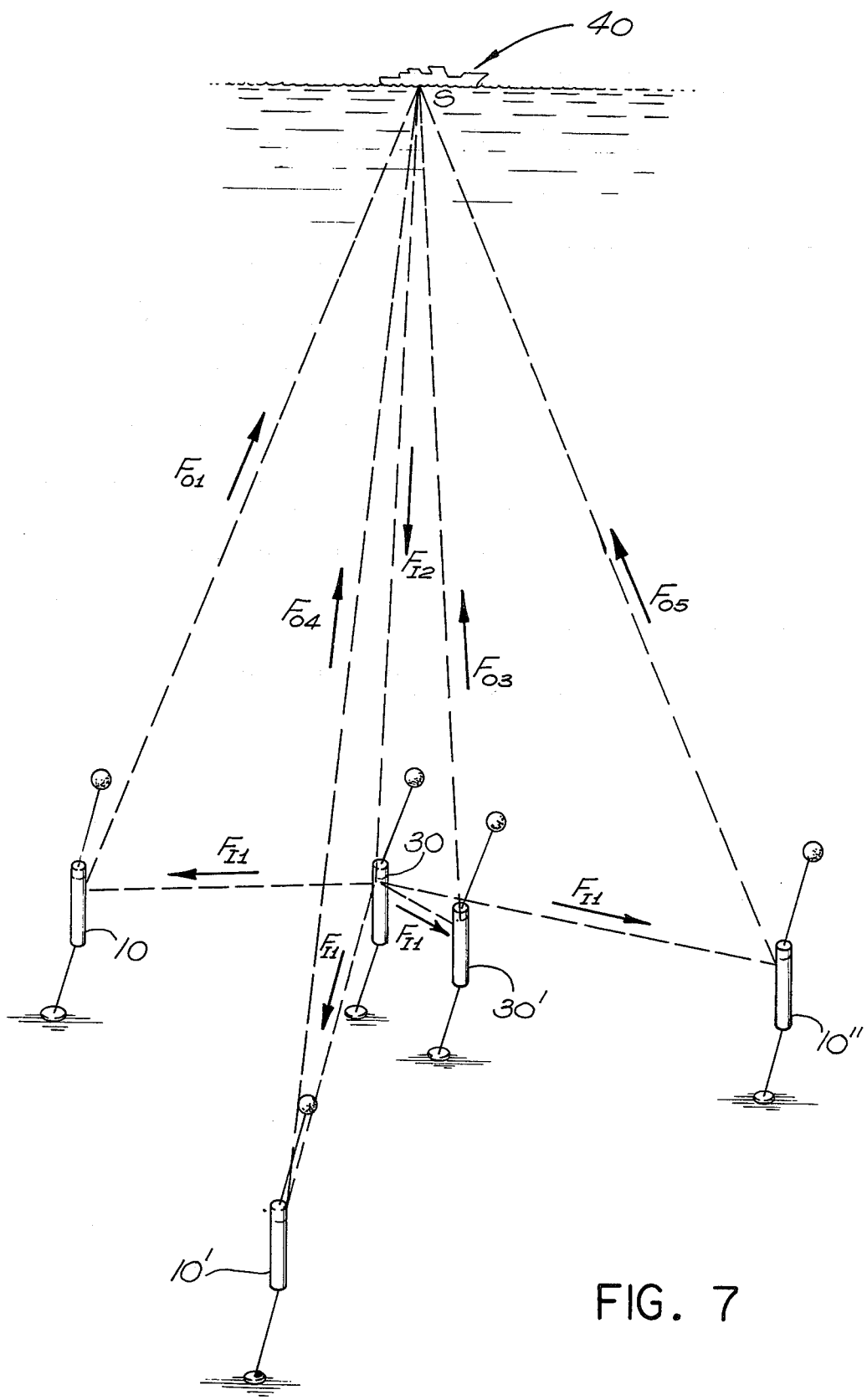
FIG. 7 and 8 are diagramatic representations of other steps in the calibration technique useful in the practice of the present invention.
Figure 8:
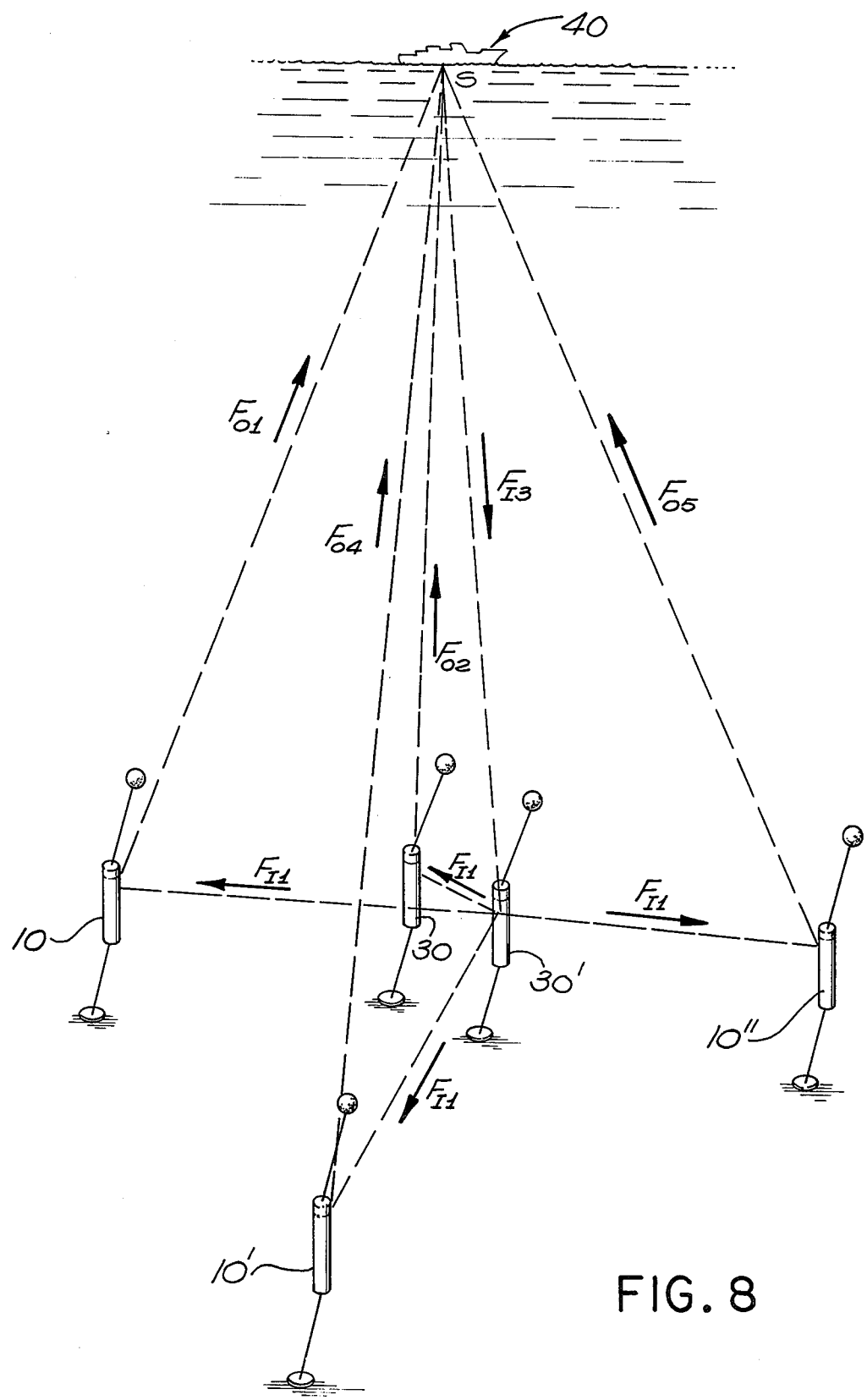

FIGS. 6, 7, and 8 illustrate the signal transmission steps for a more general case involving three transponders 10, 10' and 10", all of which are substantially similar to transponder 10, except that transponder 10' has the unique output signal $F_{O4}$ in response to the first interrogation signal $F_{f1}$ and transponder 10" has the unique output signal $F_{O5}$ in response to the first interrogation signal $F_{f1}$.

The calibration transponders are transponders 30 and 30'. In FIG. 6 the base station 40 has transmitted the first interrogation signal $F_{f1}$ to the transponders and each of the transponders 10, 10', 10", 30, and 30' respond at their unique output signals $F_{O1}$, $F_{O4}$, $F_{O5}$, $F_{O2}$, and $F_{O3}$, respectively.

FIGS. 7 illustrates the next step which is the transmission by the base station 40 of the second interrogation signal $F_{f2}$ to the calibration transponder 30. In response to receiving the second interrogation signal $F_{f2}$, calibration transponder 30 transmits the first interrogation signal $F_{f1}$ to the reamining transponders 10, 10', and 10" and 30'. Each of these transponders in response to receiving the first information signal $F_{f1}$ respond at their unique output signal $F_{O1}$, $F_{O4}$, $F_{O5}$, and $F_{O3}$, respectively.

The same sequence of events is followed for the calibration transponder 30', as illustrated in FIG. 8. Thus, the base station 40 transmits the third interrogation signal $F_{f3}$ to the transponder 30'. Upon receipt of the third interrogation signal $F_{f3}$, calibration transponder 30' transmits the first interrogation signal $F_{f1}$ to each of the transponders 10, 10', 10" and 30. Each of these transponders, upon receiving the first interrogation signal $F_{f1}$, generates its unique amount signal $F_{O1}$, $F_{O4}$, $F_{O5}$, and $F_{O2}$, respectively, and transmits it back to the base station 40. Since the signal transit times have been measured, as described above, the same set of calculations as described above in connection with FIG. 5 may be carried out for each of the transponders 10, 10', and 10" to determine the relative three dimensional geometry therebetween.

The triangle from the base station 40 to transponder 30 to transponder 30' has already been determined in the step illustrated in FIG. 7 and thus this measurement provides some redundant information useful at times in obtaining the maximum degree of accuracy.

Thus, as can be seen from FIGS. 6, 7, and 8, the two calibration transponders 30 and 30' may be utilized to calibrate any number of other transponders within signal transmission range thereof. The calibration transponders 30 and 30' are in signal transmission range of each of the transponders 10, 10' and 10" and may be recovered after calibration of the array of other transponders for reuse at subsequent time. The transponders 10, 10' and 10" remain as the array and need not be in signal transmission range of each other.

As shown by the equations specified above in connection with the description of FIG. 5, it can be seen that only the depth of the two calibration transponders 30 and 30' need be accurately known. The three dimensional coordinate determination for all the other transponders can be made by knowing just the depths of the two calibration transponders. This is seen by the selection of the transponder 30 at the origin and the transponder 30' in the X, Z plane.

As noted above, since the calibration transponders may, if desired, be made immediately recoverable after the calibration of the array of transponders, they may comprise highly efficient design considerations to minimize the cost thereof.

By selecting a long length of cable 16 for the calibration transponders 30 and 30', they are in signal transmission range of a greater number of transponders such as transponders 10, 10' and 10". Scope errors are minimized because of the short time necessary for calibration of the array and since they do not normally remain a part of the array after calibration.

Each of the interrogation signals $F_{f1}$, $F_{f2}$, and $F_{f3}$ have a characteristic, such as frequency, different from each other. Similarly, each of the output signals $F_{O1}$, $F_{O2}$, $F_{O3}$, $F_{O4}$, and $F_{O5}$ have a characteristic, such as frequency, different from each other and different from each of the interrogation signals.

The above examples have utilized in an array where each transponder receives a first interrogation signal and responds with a unique output signal. However, the present invention is not so limited. Rather, as noted above, the present invention may also be utilized in a transponder array wherein each transponder receives a unique interrogation signal and responds with a common output signal. In such an embodiment, of course, as described below in connection with FIGS. 9 and 10, each of the two calibration transponders are provided to have structure for generating each of the interrogation signals association with each of the transponders in the array in response to special calibration interrogation signals, and the calibration interrogation signals are different for the two calibration transponders and from the unique interrogation signals. Thus, each of the calibration transponders, upon receipt of the special calibration transponder interrogation signal, may sequentially generate each of the other interrogation signals associated with each other transponder in the array and in a predetermined timed sequence. The same information is then obtained in a manner similar to that described above in connection with FIGS. 4, 5, 6, 7, and 8.

FIG. 4 also illustrates an alternative embodiment of the present invention wherein an aircraft 50 may be utilized to deploy initially the three transponders 10, 30 and 30' or, if desired, only the calibration transponders 30 and 30'. The aricraft also may deploy a buoy 52 which serves the function of the base station 40. After deploying the transponders 10, 30 and 30', the aircraft 50 may send control signals Fc to the vuoy 52 and in response thereto the buoy 52 transmits the various interrogation signals such as $F_{I1}$, $F_{I2}$, and $F_{I3}$ in a controlled sequence and records the time between the transmission of the signals and the receipt of the various output signals $F_{O1}$, $F_{O2}$ and $F_{O3}$. The buoy 52 also carries conventional structure for generating, for example, a radio frequency signal which may be modulated by the output signals that it receives to provide an information signal $F_s$ for transmission to the aircraft 50. Alternatively, the buoy may automatically generate the necessary calibration signals to the transponder array and the necessary signals to the aircraft.

Figure 9:
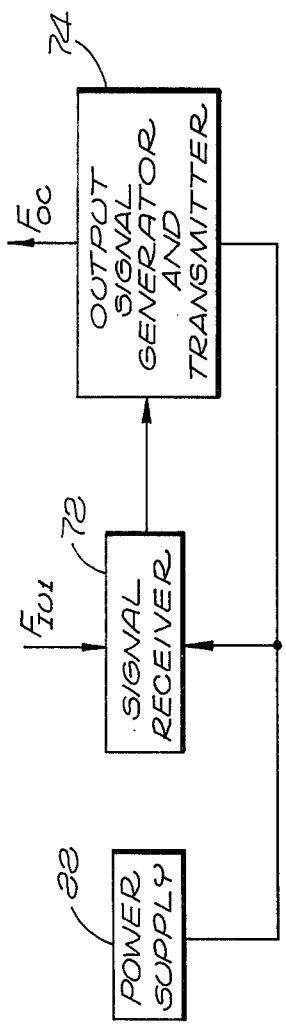
FIG. 9 is a functional block diagram of another underwater transponder useful in the practice of the present invention.

FIG. 9 is a block diagram of a transponder 70 which may be in an array of similar transponders useful in the practice of the present invention. The embodiment 70 of a transponder is of the type that may be fabricated in the same structure illustrated in FIG. 1 and is generally similar to the embodiment 10. However, in the embodiment 70 each of the transponders receive a unique interrogation signal $F_{IU_1} \ldots F_{IU_n}$ and in response thereto generates a common output signal $F_{OC}$. Transponders, such as transponder 70, may be utilized in place of the transponders 10, 10' and 10" described above. Thus, the transponder 70 is comprised of a power supply 22, of a signal receiving means 72 for receiving the unique interrogation signal $F_{IU_1}$ and output signal generator and transmitter 74 for generating and transmitting to regions remote the transponder 70 the common output signal $F_{OC}$.

Figure 10A:
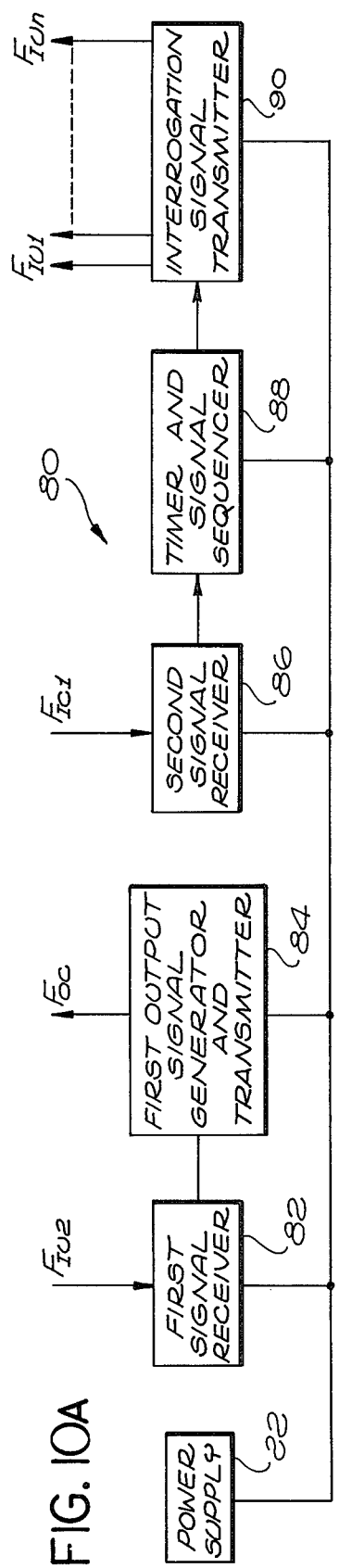
FIGS. 10A and 10B are functional block diagrams of other underwater calibration transponders useful in the practice of the present invention.

FIG. 10A illustrates an embodiment 80 of a calibration transponder that may be utilized to calibrate an array of transponder units similar to transponder 70 described above. The calibration transponder 80 has a power supply 22 and a first signal receiving means 82 for receiving a unique interrogation signal $F_{IU_2}$ and a first output signal generator transmitter means 84 for generating the common output signal $F_{OC}$ in response to receipt of the unique interrogation signal $F_{IU_2}$.

Figure 10B:
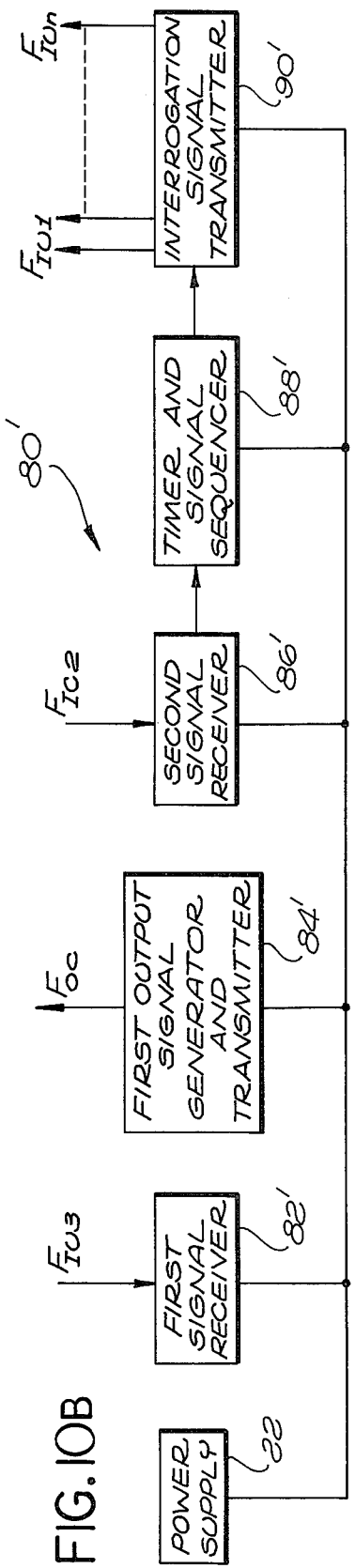

Additionally, calibration transponder 80 has a second signal receiving means 86 for receiving a calibration interrogation signal $F_{IC_1}$ and in response thereto activates a timer and signal sequencer 88. The timer and signal sequencer 88 controls an interrogation signal transmitter means 90 which generates and transmits the plurality of unique interrogation frequency signal $F_{IU_1}$ ... $F_{IU_n}$ corresponding to the number transponder 70 in the array and the other calibration transponder that may be utilized in the manner similar to that shown in FIGS. 4, 6, 7, and 8. The other calibration transponder, 80' shown in FIG. 10B is similar to transponder 80 except that it receives a unique calibration interrogation signal $F_{IC_2}$ and generates, in a predetermined timed sequence each of the other interrogation signals $F_{IU_1}$, ... $F_{IU_n}$ in response thereto. Also, the other calibration transponder generates the common output signal $F_{OC}$ in response to the unique interrogation signal $F_{IU_3}$.

Operation of the calibration arrangement according to the principles of the present invention utilizing at least two calibration transponders 80 in an array with transponder 70 is similar to that described above except that the base station such as the ship, the buoy, or other means, generates the plurality of unique interrogation signals for each of the transponders and the calibration interrogation signals and receives the common output signals therefrom and records the time difference therebetween. The same process of calculation as described above is then utilized to determine the base geometry, location and/or orientation of the transponder array.

While the above mentioned embodiments illustrate the principles of the present invention utilizing, for example, different frequencies, it will be appreciated that other characteristics of the signals may be utilized to differentiate therebetween.

In some applications, only two transponders may be required in the navigation of a ship on or under the surface of the water. The relative geometric relationship between two transponders can also be determined according to the principles of the present invention. Thus, in such an embodiment, only a single calibration transponder such as transponder 30 as shown on FIG. 4 and a regular transponder such as transponder 10 is utilized. The base leg b between transponder 10 and transponder 30 can be determined utilizing the techniques described above. However, both the depth of transponder 30 and transponder 10 must be determined to convert the slant range heights thereto into the true horizontal components. Therefore, in such an embodiment utilizing only a single calibration transponder 30 and a single other transponder 10, the procedure as described above may be followed when utilizing either a common interrogation signal and unique output signals from each of the transponders 30 and 10 or a unique interrogation signal to each of the transponders 30 and 10 with a common output signal. In such an embodiment, of course, array orientation with respect, for example, to the earth's magnetic field and/or geodetic location may be accomplish by conventional techniques as hereinabove described.

This concludes the description of the preferred embodiments of the present invention. From the above, it can be seen that there has been described a method and apparatus for providing a rapid and accurate calibration of a plurality of underwater transponders. Those skilled in the art may find many variations and adaptations of the following claims but such claims are intended to cover all such variations and adaptations falling within the true scope and spirit thereof.

I claim:

1. In a method of calibrating an underwater transponder array comprised of a plurality of transponders to determine the relative position between each transponder in the array, and each of said transponders generating a different output singal in response to receiving a first interrogation signal, and at least a first of said plurality of transponders generating said first interrogation signal in response to receiving a second interrogation signal different from said first interrogation signal, and at least a second of said plurality of transponders generating said first interrogation frequency in response to receiving a third interrogation frequency different from said first and said second interrogation signals, and said array comprising a plurality of at least three transponders, the improvement comprising the steps of:

deploying said plurality of transponders to a spaced apart array adjacent the water bottom;

measuring the depth below the surface of the water of at least two of said plurality of transponders;

sequentially generating each of said first, second and third interrogation signals from a location in the water within signal range of each of said plurality of transponders; and measuring the time period from interrogation signal transmission to receipt of said output signals from each of said transponders.

2. The method defined in claim 1 wherein said step of measuring the depth below the surface of the water of at least said first and said second transponders further comprises:

the step of measuring the depth below the surface of the water of each of said first and said second transponders; and said first, said second and said third interrogation signals are different from each of said output signals.

3. In a method of calibrating an underwater transponder array comprised of a plurality of transponders to determine the relative position between each transponder in the array, and each of said transponders generating a different output signal in response to receiving a first interrogation signal, and at least a first of said plurality of transponders generating said first interrogation signal in response to receiving a second interrogation signal different from said first interrogation signal, and a second of said plurality of transponders generating said first interrogation signal in response to receiving a third interrogation signal different from said first and said second interrogation signals, and said array comprising a plurality of at least three transponders, the improvement comprising the steps of:

deploying said plurality of transponders to spaced apart positions adjacent the water bottom, and each of said first and said second transponders positioned in signal exchanged relationship with each other transponder in said plurality of transponders;

measuring the depth below the surface of the water of at least two of said plurality of transponders;

generating said first interrogation signal from a base station at a first location adjacent the surface of the water for transmission into regions containing each of said plurality of transponders;

measuring the elapsed time at said base station for receipt of each of said output signals from each of said plurality of transponders;

generating said second interrogation signal from said base station at said first location adjacent the surface of the water for transmission into regions adjacent said first transponder;

measuring the elapsed time for receipt at said base station of each of said output signals from each of said plurality of transponders;

generating said third interrogation signal from said base station at said first location adjacent the surface of the water for transmission into regions containing each of said plurality of transponders;

measuring the elasped time for receipt at said base station of each of said output signals from each of said plurality of transponders.

4. The method defined in claim 3 and further comprising the step of:

removing at least said first and said second transponder from said plurality of transponders.

5. The method defined in claim 3 and further comprising the step of:

determining the relative orientation of said plurality of transponders.

6. The method defined in claim 5 and further comprising the step of:

determining the geodetic position of said plurality of transponders.

7. The method defined in claim 5 wherein the step of determining the relative orientation of said plurality of transponders further comprises the steps of:

moving said base station from said first location along a predetermined heading to a second location adjacent the surface of the water;

generating said first interrogation signal from a base station at said second location adjacent the surface of the water for transmission into regions containing each of said plurality of transponders;

measuring the elapsed time at said base station for receipt of each of said output signals from each of said plurality of transponders;

generating said second interrogation signal from said base station at said second location adjacent the surface of the water for transmission into regions adjacent said first transponder;

measuring the elapsed time for receipt at said base station of each of said output signals from each of said plurality of transponders;

generating said third interrogation signal from said base station at said second location adjacent the surface of the water for transmission into regions containing each of said plurality of transponders;

measuring the elapsed time for receipt at said base station of each of said output signals from each of said plurality of transponders.

8. An underwater transponder arrangement comprising, in combination:

a plurality of at least three transponders in a spaced apart array beneath the surface of a body of water;

each of said plurality of transponders comprising:

first signal receiving means for receiving a first interrogation signal; and first signal generating means for generating a unique output signal having a characteristic different from each other otuput signal and different from said first interrogation signal; and output signal transmission means for transmitting said unique output signal to a preselected region;

a first of said plurality of transponders further comprising:

second signal receiving means for receiving a second interrogation signal; and second signal generating means for generating said first interrogation signal in response to said second interrogation signal; and transmitter means for transmitting said first interrogation signal to regions containing each other transponder;

a second of said plurality of transponders further comprising:

third signal receiving means for receiving a third interrogation signal; and third signal generating means for generating said first interrogation signal in response to said third interrogation signal; and transmitter means for transmitting said first interrogation signal to regions containing each other transponder;

and at least said first and said second transponders in signal transmission range of each of said plurality of transponders.

9. The arrangement defined in claim 8 and further comprising:

base station means spaced from said plurality of transponders and in signal exchange relationship to each of said plurality of transponders, and said base station means further comprising:

base station signal generating means for generating each of said first, said second, and said third interrogation signals;

base station transmitter means for transmitting said first, said second, and said third interrogation signals to said plurality of transponders; and base station receiving means for receiving each of said unique output signals from each of said plurality of transponders.

10. The arrangement defined in claim 9 wherein: said base station means further comprises:

a ship on the surface of the body of water.

11. The arrangement defined in claim 8 wherein at least said first and said second transponder of said plurality of transponders further comprises:

depth sensing means for sensing the depth of said transponder below the surface of the water;

depth signal generating means coupled to said depth sensing means for generating a depth signal proportional to said depth below the surface of the water; and depth signal transmission means for transmitting said depth signal to regions remote said transponder.

12. The arrangement defined in claim 9 wherein: said base station means further comprises:

a buoy means comprising:

information signal generating means coupled to said base sation receiving means for generating a plurality fo unique information signals in response to receiving each of said output signals; and information signal transmitter means coupled to said information signal generating means for transmitting said plurality of unique information signals to regions remote said buoy.

13. The arrangement defined in claim 12 wherein:

each of said unique output signals from said transponders and each of said first, said second and said third interrogation signals are acoustic signals and said information signals comprise a radio frequency signal carrier.

14. The arrangement defined in claim 13 wherein:

said radio frequency signal carrier is amplitude modulated proportional to said acoustic signals.

15. The arrangement defined in claim 13 wherein:

said radio frequency carrier signal is frequency modulated by said acoustic signals.

16. The arrangement defined in claim 12 wherein:

said buoy means further comprises:

control signal receiving means for receiving a plurality of unique control signals and coupled to said base station signal generating means for selectively generating each of said first, said second, and said third interrogation signals in response to said control signals.

17. The arrangement of claim 9 wherein said base station means further comprises:

a vessel located beneath the surface of the body of water.

18. An underwater transponder arrangement comprising, in combination:

a plurality of at least three transponders in a spaced apart array beneath the surface of a body of water;

each of said plurality of transponders comprising:

first signal receiving means for receiving a first interrogation signal having a first frequency; and first signal generating means for generating a unique output signal having a frequency different from each other output signal frequency and different from said first interrogation signal frequency; and output signal transmission means for transmitting said unique output signal to regions remote from said transponder;

a first of said plurality of transponders further comprising:

second signal receiving means for receiving a second interrogation signal having a second frequency different from said first frequency and from each of said output signal frequencies; and second signal generating means for generating said first interrogation signal in response to said second interrogation signal; and transmitter means for transmitting said first interrogation signal to regions containing each of said plurality of transponders;

a second of said plurality of transponders further comprising:

third signal receiving means for receiving a third interrogation signal having a third frequency different from said first and from said second and from each of said output signal frequencies; and third signal generating means for generating said first interrogation signal in response to said third interrogation signal; and transmitter means for transmitting said first interrogation frequency signal to regions containing each of said plurality of transponders; and means for determining the depth below the surface of the water of at least two of said transponders.

19. The arrangement defined in claim 18 wherein:

said plurality of transponders is at least five.

20. The arrangement defined in claim 19 wherein:

said first and said second transponders are recoverable.

21. In a method of calibrating an underwater transponder array comprised of a plurality of at least three transponders to provide determination of the relative position therebetween and wherein each of said transponders generates a common output signal in response to receiving a unique interrogation signal, and a first of said plurality of transponders generating said unique interrogation signals corresponding to each of the other transponders in the array and in a first preselected time sequence in response to receipt of a first calibration signal different from each of said unique interrogation signals, and a second of said plurality of transponders generating said plurality of unique interrogation signals corresponding to each other transponder in the array and in a second preselected time sequence in response to receipt of a second calibration interrogation signal different from said first calibration interrogation and from each of said unique interrogation signals, and said plurality of unique interrogation signals generated by said first and said second transponders generated in a predetermined time sequence, and said common output signal different from each of said unique interrogation signals and from said first and said second calibration interrogation signals, the improvement comprising the steps of:
deploying said plurality of at least three transponders in a spaced apart array in regions adjacent the water bottom;
measuring the depth below the surface of the water of at least two of said transponders of said plurality of transponders;
sequentially generating each of said unique interrogation signals, said first calibration interrogation signal and said second calibration interrogation signal in a predetermined time sequence and from a location in the water; and
measuring the time period at said location from transmission of said unique interrogation signals said first and said second calibration interrogation signals to receipt of said common outpuut signals from each of said plurality of transponders.

22. In a method of calibrating an underwater transponder array comprised of a plurality of at least three transponders to provide determination of the relative position therebetween and wherein each of said transponders generates a common output signal in response to receiving a unique interrogation signal, and a first of said plurality of transponders generating said unique interrogation signals corresponding to each of the other transponders in the array and in a first preselected time sequence in response to receipt of a first calibration interrogation signal different from each of said unique interrogation signals, and a second of said plurality of transponders generating said plurality of unique interrogation signals corresponding to each other transponder in the array and in a second preselected time sequence in response to receipt of a second calibration interrogation signal different from said first calibration interrogation signal and from each of said unique interrogation signals, and said common output signal different from each of said unique interrogation signals and from said first and said second calibration interrogation signals, the improvement comprising the steps of:
deploying said plurality of transponders to spaced apart positions adjacent the water bottom, and each of said first and said second transponders positioned in signal exchange relationship with each other transponder in said plurality of transponders;
measuring the depth below the surface of the water of at least two of said transponders in said plurality of transponders;
sequentially generating each of said unique interrogation signals corresponding to each of said plurality of transponders from a base station at a first location in the water;
measuring the elapsed time at said base station for receipt of said common output signal from each of said plurality of transponders in response to the unique interrogation signal corresponding thereto;
generating said first calibration interrogation signal from said base station at said first location;
measuring the elapsed time for receipt at said base station of said common output signals from each of said plurality of transponders;
generating said second calibration interrogation signal from said base station at said first location;
measuring the elapsed time for receipt at said base station of said common output signals from each of said plurality of transponders.

23. The method defined in claim 22 and further comprising the step of:
removing at least one of said first and said second transponder from said plurality of transponders.

24. The method defined in claim 22 and further comprising the step of:
determining the relative orientation of said plurality of transponders.

25. The method defined in claim 24 wherein the steps determining the relative orientation of said plurality of transponders further comprises the steps of:
moving said base station from said first location along a predetermined heading to a second location in the water spaced from said first location;
sequentially generating each of said unique interrogation signals corresponding to each of said plurality of transponders from said base station at said second location;
measuring the elapsed time at said base station for receipt of said common output signal from each of said plurality of transponders in response to the unique interrogation signal corresponding thereto;
generating said first calibration interrogation signal from said base station at said second location;
measuring the elapsed time for receipt at said base station of said common output signals from each of said plurality of transponders;
generating said second calibration interrogation signal from said base station at said second location;
measuring the elapsed time for receipt at said base station of said common output signals from each of said plurality of transponders.

26. The method defined in claim 25 and further comprising the step of:
determining the geodetic position of said plurality of transponders.

27. An underwater transponder arrangement comprising, in combination:
a plurality of at least three transponders positioned below the surface of a body of water in regions adjacent the bottom thereof and in a spaced apart array;
each of said plurality of transponders comprising:

first signal receiver means for receiving a unique interrogation signal and each of said unique interrogation signals different from each other; and first signal generating means for generating a common output signal in response to receipt of said unique interrogation signal corresponding thereto and said common output signal different from each of said unique interrogation signals; and first transmitter means for transmitting said common output signal to regions remote said transponder;

a first of said plurality of transponders further comprising:

second signal receiver means for receiving a first calibration interrogation signal;

a first timer and signal sequencer means coupled to said second signal receiver means for generating a plurality of output signals, said plurality of output signals comprising said unique interrogation signals for each other transponder in said plurality of transponders and in a predetermined time sequence and in response to receipt of said first calibration interrogation signal;

a second transmitter means for transmitting said plurality of unique interrogation signals to each of said other transponders in said plurality of transponders;

a second of said plurality of transponders further comprising:

third signal receiver means for receiving a second calibration interrogation signal;

a second timer and signal sequencer means coupled to said third signal receiver means for generating a plurality of output signals corresponding to said unique interrogation signals for each other transponder in said plurality of transponders in a predetermined time sequence and in response to receipt of said second calibration interrogation signal.

a third transmitter means for transmitting said plurality of unique interrogation signals to each of said other transponders in said plurality of transponders; and at least said first and said second transponders in signal transmission range of each of said plurality of transponders.

28. The arrangement defined in claim 27 and further comprising:

base station means spaced from said plurality of transponders at a first location in the water and in signal exchange relationship with each of said plurality of transponders, and said base station means comprising:

base station signal generating means for generating each of said unique interrogation signals, said first calibration interrogation signal and said second calibration interrogation signal;

base station transmitter means for transmitting said plurality of unique interrogation signals, said first calibration interrogation signal and said second calibration interrogation signal to regions adjacent said plurality of transponders; and base station receiving means for receiving said common output signal from each of said plurality of transponders.

29. The arrangement defined in claim 28 wherein: said base station means comprises a ship on the surface of the body of water.

30. The arrangement defined in claim 28 wherein: said base station means further comprises:

a vessel located beneath the surface of the body of water.

31. The arrangement defined in claim 28 wherein: said base station means further comprises:

a buoy means comprising:

information signal generating means coupled to said base station receiving means for generating a unique information signal in response to receiving said common output signal from each of said plurality of transponders; and information signal transmitter means coupled to said information signal generating means for transmitting said unique information signal to regions remote said buoy.

32. The arrangement defined in claim 31 wherein said buoy further comprises:

control signal receiving means for receiving a plurality of unique control signals and coupled to said base station signal generating means for selectively generating each of said first and said second calibration interrogation signals and each of said unique interrogation signals in response to said control signals.

33. The arrangement defined in claim 27 wherein at least said first and said second transponders further comprise:

depth sensing means for sensing the depth of said transponder below the surface of the water;

depth signal generating means coupled to said depth sensing means for generating a depth signal proportional to said depth below the surface of the water; and depth signal transmission means for transmitting said depth signal to regions remote said transponder.

34. An underwater transponder arrangement comprising, in combination:

a plurality of at least three transponders in a spaced apart array beneath the surface of a body of water;

each of said plurality of transponders comprising:

first signal receiving means for receiving a unique acoustic interrogation signal having a frequency different from the frequency of the unique interrogation signal corresponding to each other transponder in said array; and first signal generating means for generating a common output acoustic signal having a frequency different from the frequency of each of said unique interrogation signal frequencies; and output signal transmission means for transmitting said common output acoustic signal to regions remote from said transponder;

a first of said plurality of transponders further comprising:

second signal receiving means for receiving a first acoustic calibration interrogation signal having a frequency different from said frequency of each of said unique interrogation signals and from said frequency of said common output signal; and second signal generating means for generating each of said unique interrogation signals in response to receiving said first calibration interrogation signal; and transmitter means for transmitting each of said unique interrogation signals to regions containing each of said plurality of transponders; a second of said plurality of transponders further comprising:

a third signal receiving means for receiving a second acoustic calibration interrogation signal having a frequency different from said first calibration interrogation signal and from the frequency of each of said unique interrogation signals and from said frequency of said common output signal; and third signal generating means for generating each of said unique interrogation signals in response to receipt of said second calibration interrogation signal; and transmitter means for transmitting each of said unique interrogation frequency signals to regions containing each of said plurality of transponders;

depth signal generating means coupled to at least two of said transponders for generating a depth signal having a magnitude proportional to the depth below the surface of the body of water; and depth signal transmitter means for transmitting said depth signal to regions remote said transponders.

35. The arrangement defined in claim 34 wherein:
said plurality of transponders is at least five.

36. The arrangement defined in claim 35 wherein:
said first and said second transponders are recoverable: and
said first and said second transponders further comprise said depth signal generating means and said depth signal transmitter means.

37. In a method of calibrating an underwater transponder array comprised of a plurality of two transponders to determine the relative position between said transponders, and each of said transponders generating a different output signal in response to receiving a first interrogation signal, and a first of said transponders generating said first interrogation signal in response to receiving a second interrogation signal different from said first interrogation signal, the improvement comprising the steps of:

deploying said transponders to a spaced apart array adjacent the water bottom;
measuring the depth below the surface of the water of each of said transponders;
sequentially generating each of said first and said second interrogation signals from a location in the water within signal range of each of said transponders; and
measuring the time period from interrogation signal transmission to receipt of said output signals from each of said transponders.

38. In a method of calibrating an underwater transponder array comprised of a plurality of two transponders to determine the relative position between said transponders and each of said transponders generating a different output signal in response to receiving a first interrogation signal, and a first of said transponders generating said first interrogation signal in response to receiving a second interrogation signal different from said first interrogation signal, the improvement comprising the steps of:

--deploying said transponders to spaced apart positions adjacent the water bottom, and said transponders positioned in signal exchange relationship with each other;

--measuring the depth below the surface of the water of each of said transponders;
generating said first interrogation signal from a base station at a first location adjacent the surface of the water for transmission into regions containing each of said transponders;
measuring the elapsed time at said base station for receipt of each said output signals from each of said transponders;
generating said second interrogation signal from said base station at said first location adjacent the surface of the water for transmission into regions adjacent said first transponder; and
measuring the elapsed time for receipt at said base station of said output signal from the other of said transponders.

39. An underwater transponder arrangement comprising, in combination:
two transponders in a spaced apart array beneath the surface of a body of water;
each of said transponders comprising:
first signal receiving means for receiving a first interrogation signal; and
first signal generating means for generating a unique output signal having a characteristic different from the other output signal and different from said first interrogation signal; and
output signal transmission means for transmitting said unique output signal to a preselected region;
a first of said transponders further comprising:
second signal receiving means for receiving a second interrogation signal; and
second signal generating means for generating said first interrogation signal in response to said second interrogation signal; and
transmitter means for transmitting said first interrogation signal to regions containing said other transponder; and
said first and said other transponder in signal transmission range of each other.

40. The arrangement defined in claim 39 and further comprising:
means for determining the depth below the surface of the water of each of said transponders.

41. An underwater transponder arrangement comprising, in combination:
two transponders in a spaced apart array beneath the surface of a body of water;
each of said transponders comprising:
first signal receiving means for receiving a first interrogation signal having a first frequency; and
first signal generating means for generating a unique output signal having a frequency different from each other output signal frequency and different from said first interrogation signal frequency; and
output signal transmission means for transmitting said unique output signal to regions remote from said transponder; a first of said transponders further comprising:
second signal receiving means for receiving a second interrogation signal having a second frequency different from said first frequency and different from each of said output signal frequencies; and
second signal generating means for generating said first interrogation signal in response to said second interrogation signal; and transmitter means for transmitting said first interrogation signal to regions containing the other of said transponders; and means for determining the depth below the surface of each of said transponders.

42. In a method of calibrating an underwater transponder array comprised of two transponders to provide determination of the relative position therebetween and wherein each of said transponders generates a common output signal in response to receiving a unique interrogation signal, and a first of said transponders generating said unique interrogation signal corresponding the other transponder in response to receipt of a first calibration signal different from each of said unique interrogation signals, and said common output signal different from said unique interrogation signals and from said first calibration interrogation signal, the improvement comprising the steps of:

deploying said transponders in a spaced apart array in regions adjacent the water bottom;

measuring the depth below the surface of the water of each of said transponders;

sequentially generating said unique interrogation signals and said first calibration interrogation signal from a location in the water; and measuring the time period at said location from transmission of said unique interrogation signals said first calibration interrogation signal to receipt of said common output signals from each of said transponders.

* * * * *